(12) United States Patent
Charugundla et al.

(10) Patent No.: US 9,736,314 B2
(45) Date of Patent: Aug. 15, 2017

(54) BROADCASTING SYSTEM

(71) Applicants: Kent Srikanth Charugundla, New York, NY (US); Sarina Priya Charugundla, New York, NY (US)

(72) Inventors: Kent Srikanth Charugundla, New York, NY (US); Sarina Priya Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 0 days.

(21) Appl. No.: 14/696,061

(22) Filed: Apr. 24, 2015

(65) Prior Publication Data
US 2016/0316066 A1 Oct. 27, 2016

(51) Int. Cl.
*H04M 11/00* (2006.01)
*H04M 11/04* (2006.01)
*H04M 7/00* (2006.01)

(52) U.S. Cl.
CPC ....... *H04M 7/0039* (2013.01); *H04M 7/0066* (2013.01)

(58) Field of Classification Search
CPC .............. H04N 7/16; H04M 2203/353; H04M 2203/4518; H04L 12/189; H04L 12/1877; H04L 12/1886; H04W 4/06; H04W 60/02
USPC ........ 379/39, 41; 348/14.02; 455/3.01, 3.04
See application file for complete search history.

(56) References Cited

U.S. PATENT DOCUMENTS

| | | | | |
|---|---|---|---|---|
| 8,554,265 B1* | 10/2013 | Buchanon | ............... | H04W 4/06 455/523 |
| 2002/0028678 A1* | 3/2002 | Ohmoto | .............. | H04W 72/005 455/450 |
| 2005/0075107 A1* | 4/2005 | Wang | .................. | H04L 12/1877 455/435.1 |
| 2008/0005347 A1* | 1/2008 | Ott | .................... | G06F 17/30017 709/231 |
| 2008/0049704 A1* | 2/2008 | Witteman | .............. | H04H 60/58 370/342 |
| 2008/0098091 A1* | 4/2008 | Benco | ................. | H04M 3/5307 709/219 |
| 2012/0047541 A1* | 2/2012 | Noda | ................. | H04N 7/17318 725/91 |

(Continued)

*Primary Examiner* — Quoc D Tran
(74) *Attorney, Agent, or Firm* — Paul J. Sutton; Barry G. Magidoff (57) ABSTRACT

A broadcasting system provides a telephone number as identity information during a registration process of a user equipment intended to be used as a user broadcasting equipment. The telephone number is one of many telephone numbers associated with the broadcasting system. During the registration process in which the user equipment is identified as a user broadcasting equipment, various information associated with the user equipment are obtained and stored. The identity information, i.e., the telephone number, maps to the stored information such that when the user equipment is used to dial the provided telephone number, the broadcasting system automatically recognizes the user equipment is making a dial to broadcast request. Upon checking the stored information associated with the user equipment, the broadcasting system allows the user equipment to broadcast to one or more other user equipment registered as listeners to a scheduled broadcast.

33 Claims, 2 Drawing Sheets

(56) References Cited

U.S. PATENT DOCUMENTS

| | | | |
|---|---|---|---|
| 2012/0059910 A1* | 3/2012 | Cassidy | G06F 17/30029 709/219 |
| 2013/0268962 A1* | 10/2013 | Snider | H04N 21/8547 725/32 |
| 2014/0195229 A1* | 7/2014 | Charugundla | G10L 15/265 704/235 |

* cited by examiner

BROADCASTING SYSTEM

BACKGROUND

Field of the Disclosure

The present disclosure generally relates to communication networks and in particular to using various communication networks as a broadcasting system.

Description of Related Art

This section is a discussion intended to provide a better understanding of the disclosure herein, but makes no claim as to the relevant prior art for this disclosure. As capabilities of communication devices increase and techniques for streaming live video and audio over the Internet improve, there is an increasing interest in providing another source of live broadcast without the need for expensive and professional equipment typically found at a radio or television station.

SUMMARY

This summary is provided as a disclosure of some embodiments of a broadcasting system discussed herein. These embodiments and others are described below in the Detailed Description. This summary is not intended to identify key features or essential features of the claimed subject matter, not is this summary intended as an aid in determining the scope of the claimed subject matter.

Disclosed herein are various embodiments of a broadcasting system. In one embodiment, the broadcasting system of this disclosure comprises an input/output (I/O) interface, a signal processing module coupled to the I/O interface, a broadcast module coupled to the I/O interface, and a management module coupled to the broadcast module, the I/O interface and the signal processing module. The I/O interface extracts identity information from a received signal (e.g., a received telephone call), transfers the extracted identity information to the management module and transfers the received signals of the phone call to the signal processing module for generating a processed signal. Thus, when the management module determines that the extracted identity information matches stored information previously generated by the management module during a broadcaster registration process, the management module transfers the processed signal to the broadcast module for broadcasting. As a result, signals transmitted to the broadcasting system from a user equipment (registered as broadcaster equipment) are broadcast (by the broadcasting system) to one or more user equipment registered as listener user equipment.

When the management module determines that the extracted identity information matches stored information previously generated by the management module during a listener registration process, the management module admits the listener member to a scheduled broadcast allowing the user equipment of a listener to receive the broadcast signals from the user equipment of a registered broadcaster that is currently broadcasting.

In another embodiment, a method of the present disclosure comprises determining, by a broadcasting system, whether a received call is a dial to broadcast request or a request to listen to a broadcast. The method further comprises broadcasting, by the broadcasting system, information received in the call to one or more registered listener equipment after having extracted identity information from the call, which identity information maps to stored information identifying the call as originating from a registered broadcaster user equipment and which identity information was generated by the broadcasting system during a registration process. The identity information can be, for example, a telephone number of the broadcasting system. Thus a registered broadcaster can dial a telephone number that is recognized by the broadcasting system as identity information of a broadcaster causing the broadcasting system to broadcast signals it receives from the broadcaster.

In another embodiment of the method of the present disclosure the information that is being broadcast is recorded and stored in a database.

In yet another embodiment of the method of the present disclosure, the identity information is a telephone number dialed to initiate the call.

In yet another embodiment of the method of the present disclosure, the identity information is a system generated password or system generated sequence of alphanumeric characters during registration.

In yet another embodiment of the method of the present disclosure, the broadcasting system confirms that the user equipment from which the call originates is a registered broadcaster user equipment.

In yet another embodiment of the method of the present disclosure, the confirmation of the broadcasting system is based on receiving answers to questions where such answers match previously documented answers to the same questions during a registration process.

In yet another embodiment of the method of the present disclosure, a question and answer session is initiated by the broadcasting system at a defined time instance during a broadcast.

In yet another embodiment of the method of the present disclosure, upon initiating the question and answer session, the broadcasting system broadcasts an announcement to all registered listener user equipment inviting questions from eligible registered listener user equipment.

In yet another embodiment of the method of the present disclosure, the questions originate from eligible registered listener user equipment at selective time instances controlled by the broadcasting system.

In yet another embodiment of the method of the present disclosure, the questions from eligible listener user equipment are broadcast to all listeners of the broadcast.

In yet another embodiment the method of the present disclosure further comprises the step of providing access to the broadcast to registered listener user equipment when the extracted identity information maps to information identifying the call as originating from a registered listener user equipment.

In yet another embodiment of the method of the present disclosure, the step of determining whether a received call is a dial to broadcast request or a request to listen to a broadcast further comprises determining whether the received request has occurred during a defined pre-broadcast time window.

In yet another embodiment, the method of the present disclosure further comprises the step of performing broadcast preliminaries upon determining that the received call is a dial to broadcast request that has occurred during a defined pre-broadcast time window.

In yet another embodiment of the method of the present disclosure, where the broadcast preliminaries comprise the system directing broadcaster user equipment or listener user equipment to transmit test signal streams where the test signal streams originated from the broadcasting system and were downloaded onto the user equipment by broadcasting system during the preliminaries or during registration.

In yet another embodiment of the method of the present disclosure, the broadcast preliminaries comprise messages sent to the user equipment requesting confirmation of identity of user operating the user equipment.

In yet another embodiment the method of the present disclosure further comprises the step of sending a wait message to user equipment that transmitted a dial to broadcast request that has occurred outside of the pre-broadcast time window.

In yet another embodiment of the method of the present disclosure, the wait message is a voice message or a text or an email.

In yet another embodiment of the method of the present disclosure, the broadcasting system transmits a 'no broadcast message to the registered user listener user equipment when the broadcast system has determined that no broadcast will occur for a request made by the registered user listening equipment.

In yet another embodiment of the method of the present disclosure, the system transmits a message to the registered user equipment inviting access to recorded broadcasts.

BRIEF DESCRIPTION OF THE DRAWINGS

The understanding of the present disclosure and its numerous features and advantages are facilitated for those skilled in the relevant art of this disclosure by referring to the accompanying drawings. Reference numerals and/or symbols are used in the drawings. The use of the same reference in different drawings indicates similar or identical components, devices or systems. Various other aspects of this disclosure, its benefits and advantages may be better understood from the Detailed Description herein and the accompanying drawings described as follows.

DETAILED DESCRIPTION

The present disclosure describes a broadcasting system that allows users to subscribe to and register for broadcasting or listener services (or both) available through the broadcasting system of this disclosure. A subscriber who has registered for broadcasting or listener services can dial a number (provided by the system during registration) to broadcast a scheduled program or to listen to a scheduled program. For broadcasting services, a user may subscribe as a broadcaster who can originate a scheduled broadcast (for which he/she has registered as part of being a subscriber) using, for example, a smart phone, laptop computer, a desktop computer or some other well known communication device to perform a function labeled as a 'dial to broadcast' function of the broadcasting system of this disclosure. It should be noted that the terms 'user equipment' mobile terminal' and communication device will be used herein interchangeably to refer to cellular phones, smart phones, tablets, computer laptops, desktop computers, legacy telephones, IP (Internet protocols) telephones and various well known communication portable or non-portable devices.

In particular, a user wishing to broadcast at a particular time for a particular length of time can subscribe to the system and then at various times register for such broadcasting services via the Internet at a website controlled and operated by the broadcasting system of the present disclosure. A user can also subscribe and register for such 'dial to broadcast' services via telephone (e.g., cellular phone, IP telephone and wireline telephone) by dialing a toll free number, for example.

Upon registering, the user is provided with identity information, which the user can use when he or she is ready to broadcast (if the user is a "broadcaster") or which the user can use when he or she wants to listen (if the user is a "listener") to a broadcast for which he/she registered. The identity information is generated by the broadcasting system as will be discussed herein. The identity information can be, for example, a telephone number, which the user (registered as a broadcaster) dials when he/she is ready to broadcast. Identity information is information generated by the broadcasting system of the present disclosure and provided to a subscriber (i.e., information transmitted to the user equipment) during a registration process when the subscriber registers as either a broadcaster or a listener, and which is used by such subscriber to initiate contact with the broadcasting system where said contact establishes the subscriber's indication or desire to the broadcasting system to start a broadcast or to listen to a broadcast. Establishment of a subscriber's indication to start a broadcast or to listen to a broadcast refers to a procedure in which the broadcasting system confirms the subscriber's identity as the registrant. The confirmation of the subscriber's identity includes the broadcasting system receiving answers (from a user equipment that dialed the system using identity information) to certain questions posed by the broadcasting system to the subscriber, which answers match answers provided by the subscriber to the same questions during the registration process.

The registration process comprises a prospective user visiting a website and entering requested user information such user name, address, email address, manner of payment for the services, agreement to pay for the services being provided by the broadcasting system, identity of one or more communication devices (e.g., cellular phone, legacy phone, IP phone) the user expects to use when broadcasting or listening to broadcasts. The user may register as a broadcaster or a listener and this information is also included in the user information so that when the user dials the telephone number (i.e., one type of identity information) provided to him/her during registration by the broadcasting system, the system will be able to determine whether the user is a broadcaster or a listener from the particular identity information provided to the user during registration. Also, during the registration process, a user (either a listener or broadcaster) will be provided with an identity information (e.g., telephone number, password, sequence of alphanumeric characters) which the user must include when initiating contact with the broadcasting system with the intention or desire to broadcast a program live or a program to be recorded and broadcast at another time, or to listen to a live broadcast or a pre-recorded broadcast. During the registration process, the user will also be given other identity information that will allow a listener to participate in a question and answer session during a live broadcast.

Upon establishment of the call between the user and the broadcasting system where the number dialed by the user is identity information, the user can broadcast to listeners who have also subscribed and registered with the broadcasting system of the present disclosure. The listeners also dial the same telephone number, but they are each identified by the system (based on their registration and subscription information in a similar manner to the subscriber) as listeners or "audience members" and will be able to hear the broadcast at the scheduled time for the scheduled length of time using any of the communication devices described above.

In short, the broadcasting system of the present disclosure maps a registered user's information to the identity information (e.g., telephone number generated by the broadcasting system) so that when that number is dialed, the equipment on which the number was dialed (e.g., cellular phone, IP phone) is automatically given broadcasting capabilities or is allowed to listen to a broadcast as long as the broadcast is currently occurring; this is done only after the broadcasting system has confirmed the subscriber's identity (as described above) as either a broadcaster or a listener. The particular mapping (association between identity information and user provided information) including its structure is generated by the broadcasting system of the present disclosure during a registration process. A user having the capability to dial information to either broadcast a scheduled program or listen to a scheduled program is said to have a "dial to broadcast" capability. Thus a 'dial to broadcast request' refers to a registered subscriber—registered as a broadcaster—initiating contact with the broadcasting system by using the identity information identified and stored during a registration process. A 'dial to request to listen to a broadcast request' is when the registered subscriber—registered as a listener—initiates contact with the broadcasting system, again using identity information identified and stored during a registration process.

The identity information can also be provided through a link on the Internet or via a particular website made available to current subscribers or other subscribers (i.e., potential broadcasters or potential listeners). A subscriber who accesses that website is provided with the identity information by the broadcasting system of the present disclosure and—after certain preliminaries, to be described herein, are performed—is thus given the opportunity to dial a number to start a broadcast or to listen to a broadcast depending on whether the subscriber is registered as a broadcaster or as a listener. A particular user can have different accounts and thus have multiple identity information some of which can be for broadcasting services and others for listener services. The information being broadcast can be voice, graphics, video (e.g., multimedia), text, streaming text similar to closed captioning of audio on television broadcasts, Instant Messaging (IM) text, or any combination thereof.

The broadcast system of the present disclosure maps the identity information to user information so that when a subscriber (registered as a broadcaster) uses a user device (e.g., cellular phone) to dial a number that is an identity information, the broadcasting system of the present disclosure—after some preliminary procedures—recognizes the identity information and automatically allows signals (e.g., voice, video, graphics, text, closed caption text, IM text or any combination thereof) from that user equipment to be broadcast; if the person that performed the dialing is a listener (i.e., an audience member) the broadcast system allows the user equipment to receive broadcast signals from the broadcast. It should be noted that the signals broadcast by the broadcasting system of the present disclosure can be different types of signals all of which carry information in various forms. That is, during a broadcast, the information being broadcast can simultaneously be in the form of video, audio, text, streaming text, closed caption text, IM text or any combination thereof. In particular, for any broadcast, the broadcast system of the present disclosure can simultaneously broadcast to various listeners signals in multiple forms to multiple types of user equipment simultaneously.

Figure 1:
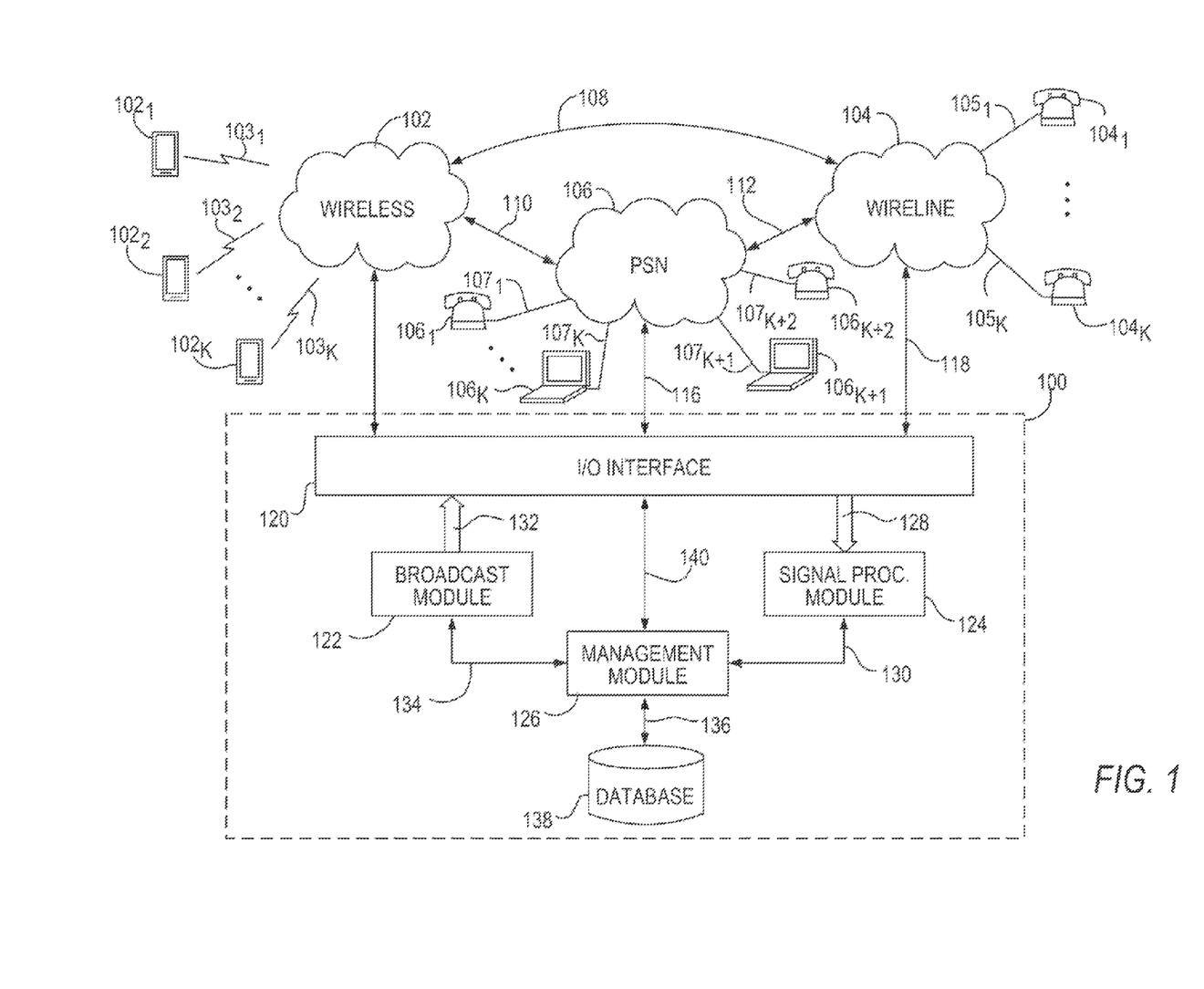
FIG. 1 depicts the broadcast system of the present disclosure coupled to three different communication networks.

FIG. 1 shows a block diagram of one embodiment of the broadcasting system of this disclosure. The embodiment of the disclosure as shown in FIG. 1 comprises an I/O interface 120 coupled to three different communication networks 102, 106 and 104. Communication network 102 is a wireless network and can be any one of several types of wireless networks such as digital wireless communication networks, hybrid analog/digital wireless communication networks. For example wireless communication network 102 can be 2G, 3G, 4G LTE (Long Term Evolution), VoLTE (voice over LTE network) wireless communication networks, or any other wireless networks currently being developed (e.g., 5G, 6G or beyond) or Voice over Internet Protocol (VoIP) networks. Communication network 106 is a Packet Switching Network (PSN) such as the Internet. Communication network 104 is a legacy network or any combination of legacy voice networks such as POTS (Plain Old Telephone System) or the Public Switched Telephone Network (PSTN). It should be noted that the broadcasting system of the present disclosure could be coupled to any number of different communication networks; it is shown coupled to three different networks only for ease of discussion and illustration.

The communication networks are shown connected to each other, i.e., coupled directly or indirectly to each other. As shown, wireless network 102 is coupled to 106 and wireline communication network 104 via communication links 110 and 108 respectively. PSN 106 is shown coupled to wireless network 102 and wireline network 104 via communication links 110 and 112 respectively. Wireline network 104 is shown coupled to PSN network 106 and wireless network 102 via communication links 112 and 108 respectively.

Depending on the particular network, different user equipment are applicable. For example, for wireless network 102 the user equipment are cellular phones (i.e., mobile terminals) such as smart phones $102_1, 102_2, \ldots, 102_K$, (where K is an integer equal to 1 or greater) or tablets. The mobile terminals $102_1, 102_2, \ldots, 102_K$ communicate with the network 102 via wireless communication links $103_1, 103_2, \ldots, 103_K$ respectively where such wireless communication links may be part of an air interface of a cellular network operated in accordance with various protocols that are part of a communication standard being followed by communication network 102.

For packet switched network 106 (e.g., the Internet), the user equipment may be wired telephones, cellular telephones, computers including laptop computers, desktop computers and any other communication device configured, operated and/or controlled by a user. For example, PSN 106 may communicate with the following user equipment: IP (Internet Protocol) telephone $106_1$, laptop computer $106_K$, desktop computer $106_{K+1}$, and telephone $106_{K+2}$; the user equipment communicate with network 106 via communication links $107_1, 107_K, 107_{K+1}$, and $107_{K+2}$ respectively, where K is an integer equal to 1 or greater. Such links may be various communication channels or access networks provided by a packet switched network access provider, which formats the information transmitted by the user equipment in accordance with the protocols of a communication standard being followed by the PSN (e.g., the Internet).

For wireline network 104 (e.g., POTS or PSTN or both), the user equipment are telephones (cordless or corded) designed to operate in legacy telephone networks. Some of the user equipment may also be able to operate in legacy networks as well as IP or packet switched networks. Telephone $104_1$ and $104_K$ are shown coupled to wireline network 104 via communication links $105_1$ and $105_K$ where K is an integer equal to 1 or greater. It should be noted that for the three networks described herein, the variable K, at any time, may have a different or same value for the different networks and there are no relationships between the variable K for the different networks. Also, the broadcasting system of the present disclosure can communicate with any hybrid communication network comprising a combination of two or more of the networks described above and any other communication network capable of being combined with the networks described above.

The three communication networks described above are shown connected or coupled (directly or indirectly) to the broadcasting system of this disclosure via communication links 114, 116 and 118. Each such communication links is shown figuratively and for ease of illustration as single continuous paths between the broadcast system of this disclosure (in particular I/O interface 120) and the particular network. It will be clearly understood however that these connecting paths may be combinations of communication channels and equipment made accessible by network providers based on the bandwidth and signaling requirements of the broadcasting system of this disclosure.

Continuing with FIG. 1, and in particular with the description of the broadcasting system of this disclosure, I/O interface 120 is shown coupled to signal processing module 124, management module 126 and broadcast module 122 via paths 128, 140 and 132 respectively. Signals received by I/O interface 120 are initially processed by the I/O interface 120. In particular, the received signal contains identity information that was previously generated by management module 126 during a registration process (as will be described herein). For example, the identity information may be a particular telephone number that a user dials to establish communications with the broadcasting system of this disclosure. Another example may be a username/password login combination that a user creates during initial subscription or during registration and at any time later uses such information to gain access to the broadcasting system of this disclosure. For example, upon entry onto a website provided by the operators of the broadcasting system of this disclosure, the user may be prompted to enter a username, or a password (previously stored by the user during a previous registration process) or both to start broadcasting or to start to listen to a broadcast for which the user has already registered.

Upon reception of signals from any one of the networks 102, 140 106, (or other network not shown), the I/O interface 120 searches for and extracts identity information from the received signals. For ease of explanation, suppose for example, that the identity information is a telephone number dialed by the user equipment of a subscriber. The number dialed is identity information provided to the user at time of registration for broadcasting services. After extracting the identity information, the I/O interface 120 transfers the identity information (e.g., a telephone number) to management module 126 via path 140.

Once the extracted telephone number is transferred to management module 126, the management module 126 automatically takes steps to (i) confirm that the extracted number is one of the telephone numbers it generated during a registration process and which it stored in a database (e.g., database 138) during the registration session or the identity information can be a username and password created by the owner of the user equipment or a username or a password created by the user during registration; (ii) identify the calling party as a subscriber/broadcaster or a subscriber/listener; (iii) determine to which broadcast currently occurring (or is about to start) does the calling equipment relate; and (iv) depending on whether the calling party is a broadcaster or listener, allow the calling party to start broadcast (after performing preliminary pre-broadcast procedures) or admit calling party to the set of listeners (i.e., audience members) that forms the audience of the broadcast.

The management module 126 is able to identify the subscriber and the broadcast to which the subscriber is associated (as either a broadcaster or a listener) from a data structure stored in database 138 (to which management module 138 has access via path 136). The data structure maps identity information generated by the management module 126 to stored information about a subscriber and to information about the various services for which the subscriber has registered. This data structure can be updated by the management module (via path 136) as needed based on new registrations or cancelled registrations, or new, or cancelled subscriptions. The broadcasting system of the present disclosure queries the subscriber with specific questions (whose answers were given by the subscriber during registration) to see confirm the identity of the subscriber. A user whose answers do not match those stored in database 138 is not given broadcasting capabilities.

Still continuing with FIG. 1, after I/O interface 120 transfers (via path 140) the extracted identity information to management module 126, it also transfers (via path 128) the received signals to signal processing module 124 where the received signal is processed by receiver circuitry, filter circuitry, digital buffers and at least one of a microprocessor, microcomputer, server, desktop computer, and laptop computer and a digital signal processor. The signal processing module 124 prepares the received signal for broadcast to various networks to which the broadcasting system of the present disclosure is coupled. Any distortions or anomalies experienced by the received signal are significantly reduced or even eliminated by the various processing circuits in signal processing module 124. As shown and discussed with respect to FIG. 1, some of the networks may be digital networks and others may be analog networks and thus the signal processing module 124 under the control of the management module 126 will configure the received signals in the various proper formats for the different communication networks. Signal processing module 124 transfers the processed received signals to the management module 126 via path 130.

Management module 126 confirms that the various forms of the processed received signals have been completed and the received signals are ready to be broadcast. Management module 126 also confirms that signal processing module has generated the received signals in various formats compatible with the formats of the user equipment that will receive such signals. For example, a user with a hearing impairment may want to receive the broadcast in a streaming text format instead of voice. Management module 125 is able to re-transfer (via path 130) the processed signals back to signal processing module 124 if the proper adjustments and processing needed to be made to the received signals cannot be confirmed. The proper adjustments and processing can once again be performed on said received signals. Such an iterative process can continue until management module 126 confirms that the received signals have been properly processed and are ready for broadcast.

Management module 126 then transfers the received processed signal to broadcast module 122 via path 134. Prior to transferring the received processed signal to the broadcast module 122, the management module 126 confirms that the destination network(s) and ultimate user destination of said processed received signals have been identified and will be broadcast over the proper broadcast channels. It will be readily understood that the broadcast signals can be broadcast in various formats and to different type of networks simultaneously as will be discussed herein. The proper broadcast channels correspond to the information associated with the identity information for the received signals; that is, for each received signal, the management module 126 receives (via path 140) identity information from I/O interface 120. The identity information maps to the identity of the broadcasting subscriber, the identity of the various listener subscribers, the broadcast time and duration, the type of signal (i.e., analog, digital) to be used in the broadcast signal and the format (e.g., voice, streaming text, video, IM text) of the information being carried by the broadcast signal. All of this information is stored in database 138 during registration of subscriber/broadcasters and subscriber/listeners.

The proper broadcast channel will be different for different types of signals and different types of formats of the information being carried by the signals. For example a broadcast signal for a legacy phone may be an analog signal whereas a broadcast signal for an IP phone are digital packets that traverse a packet switching network such as the Internet. For one signal type received by the broadcasting system of the present disclosure, a variety of signal types may be broadcast simultaneously depending on the requirements and/or capabilities of the receiving equipment of the listeners. For example, a broadcast originating from a voice over IP telephone have signals that are formatted as packets for traversing a packet switched network such as the Internet. Such packets once received by the broadcasting system of the present disclosure can be replicated as analog voice for listeners with legacy phone equipment, as streaming text for smart phone equipment used by users who may be hearing impaired, or as multimedia signals (i.e., video+voice or video+voice+streaming text) for smart phone equipment, laptop computers, and desktop computers. All of these different types of broadcast signals can be broadcast simultaneously to different types of networks.

Management module 126 comprises at least one of a digital signal processor, a server, a microprocessor, a microcontroller, a desktop computer, a laptop computer or any combination thereof. Management module 126 further comprises various digital and analog interface circuits to allow it to engage the I/O interface 120, the signal processor module 124, the broadcast module 122 and database 138. Database 138 contains memory circuits or memory storage systems for storing the identity information, the information describing the received signal, the format and type of the received signal, the name of the subscriber associated with the received signal, the type of user equipment that generated the received signal, and correct type of broadcast channel(s) for the received signal.

Broadcast module 122 comprises the proper processors (e.g., microprocessor, digital signal processors), transmit circuitry for digital and analog signals and the processing circuits for properly formatting the signals to be broadcast. As such, the broadcast module 122 further comprises at least one of a digital signal processor, a microprocessor, a microcontroller, a server, a desktop computer and a laptop computer. The signal is broadcast via path 132 to I/O interface 120 from which it is routed to various members of the audience located in any one of the three networks (104, 102 and 106) or any combination thereof. Thus, listeners to the broadcast can be, for example, users of legacy phones, hard of hearing users of smart phones receiving streaming text plus video, hard of hearing users of smart phones receiving streaming text, users of IP phone, users of desktop computers, and users of laptop computers receiving multimedia (i.e., video+voice+streaming text) or any combination thereof.

It should be noted that the broadcasting system of the present disclosure can be implemented in various manners including using one or more communication servers able to receive, transmit and broadcast information in various formats using different types of signals for different types of communication networks (including the ones shown in FIG. 1) that comply with different communication standards and associated protocols.

Figure 2:
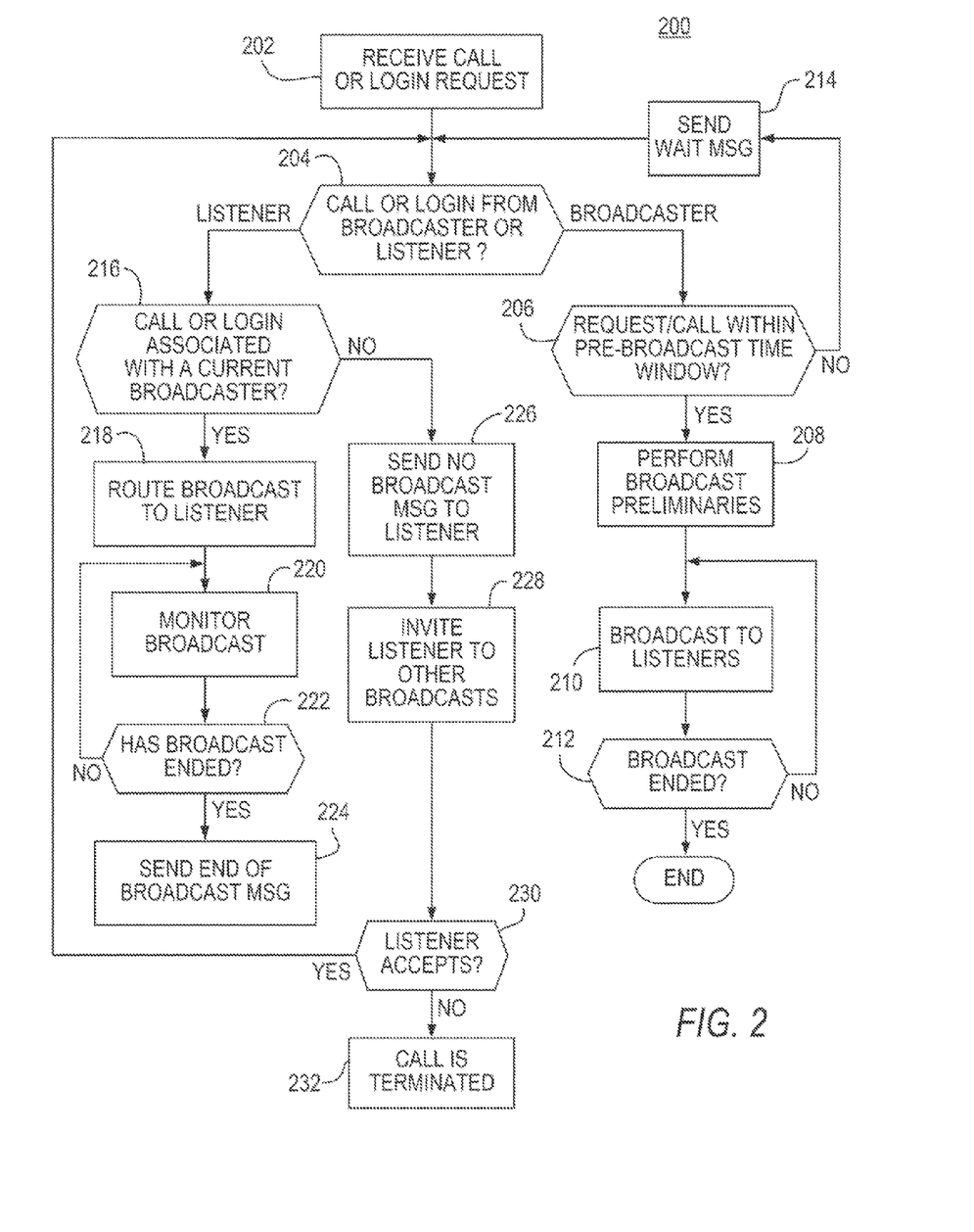
FIG. 2 is a flowchart of the operation of the broadcast system of FIG. 1.

Referring now to the method of this disclosure, there is shown in FIG. 2 a flow chart of the method performed by the broadcasting system disclosed herein. In step 200, the broadcasting system—and in particular—I/O interface 120 receives a ring signal, or a request from a web site operated and controlled by the broadcasting system of the present disclosure. The broadcasting system of the present disclosure is configured to receive and process such signals or requests or both. Depending on the network from which the ring signal or request originates, the service provider handling the call (or request) may provide DNIS (Dialed Number Identification Service) information to the broadcasting system of the present disclosure. The DNIS provides signaling information that allows the circuitry within the I/O interface (e.g., digital signal processor) to determine the phone number dialed by the calling party. The service provider may provide the telephone number dialed by a calling party in any one of many well-known manners established and practiced by various networks. Accordingly, I/O interface 120 is able to use well-established and well-known methods to obtain the telephone number dialed by the calling party.

In another embodiment, a broadcast system generated Internet web link from which the user can originate his/her broadcast is provided to the user communication device. At that web link the user will be provided instructions on how to download or otherwise access applications ("apps" or executable programs) that will allow the user's communication device (e.g., smart cell phone, IP phone, desktop computer, laptop computer) to broadcast in one or more formats (e.g., voice, voice+video, streaming text, graphics or any combination thereof) simultaneously or separately or alternately both. The different formats can be broadcast as different types of signals; that is, the signals can be analog signals, digital signals, packets of digital signals, or switched packets of digital signals. The different types of signals may be in different formats at various times during their transmission to a listener communication device after having been broadcast by the broadcasting system of the present disclosure. In particular, the user—once having accessed said web link—will have the capability of transmitting various types of signals in various format (e.g., voice, data, video stream) from his/her communication device using a camera and/or microphone that is part of the user's communication device.

The apps downloaded onto the user's communication device from the broadcasting system are obtained from database 138 (where they are stored) and can be downloaded by management module 126 onto a user's device upon the user accessing the link and inputting the proper login and password information generated during the user's registration process and the user's request to broadcast at a scheduled time. The apps allow the user to operate such components as a microphone, a camera, a particular graphics generated program, all of which are part of the user's communication device (e.g., desktop computer, laptop computer, smart phone). The communication device thus can be used by the user to broadcast different types of information (voice, video, streaming text, graphics) at different times or simultaneously during the broadcast. In short, the broadcasting system of the present disclosure (in particular, I/O interface 120) extracts the identity information from the call or from a request made by a subscriber at a system provided web link.

The apps are available to user communication device that have the capabilities commensurate with the app. The broadcasting system will query the user during registration to identify the particular type(s) of communication device (which may include model no., manufacturer of device) the user plans on using for broadcasting purposes. For example, a cellular phone with no camera may not able to use the app for video transmission. The broadcasting system of the present disclosure will provide apps for such a communication device that does not include the transmission of videos or pictures.

The apps downloaded onto a user's equipment are part of the information that is mapped to the identity information for that user. The identity information can a telephone number or a web link both of which are generated by the broadcasting system of the present disclosure and provided to the user via his/her communication device during registration. When a user accesses the broadcasting system to start a scheduled broadcast by accessing a system provided web link or dialing a system provided telephone number, the information associated with the identity information including the type of communication device the user is to use is provided to the user prior to the broadcast to confirm that the user will be using a communication device whose identity matches the information the user inputted during registration. Such a user equipment is a registered broadcaster user equipment or a registered listener user equipment depending on whether the user registered as a broadcaster or a listener. The confirmation of the broadcasting system is based on whether answers to questions it poses to the user and whether these answers match previously documented answers to the same questions during a registration process. A question and answer session may be initiated by the broadcasting system (for various purposes) at a defined time instance during a broadcast.

In another embodiment of the present disclosure, the call from a subscriber or a prospective subscriber may originate from a website operated and controlled by the owners of the broadcasting system of the present disclosure; this website may have a telephone number that the user is to dial to enable broadcasting. For situations where the user has a laptop or desktop computer, the web site may be cause such devices to operate in much the same manner as a smart phone with video, audio, text, streaming text, audio, multimedia (voice+audio and possibly streaming text) capabilities. The web site may also contain various instructions from the broadcasting system that the user is to follow prior to the start of broadcast. In such circumstances, the user, after having subscribed and registered may dial—at the website controlled and operated by the owner of the broadcasting system of the present disclosure—a telephone number to start a broadcasting session or to listen to a broadcast. The telephone number dialed by the user is a number that he/she received when he/she registered at the website. The website is designed to be operated from a desktop or laptop computer or from a mobile device such as a smart phone or a tablet.

The broadcasting system may send the identity information (e.g., telephone number, web link) via text or email to the registered user. The user may further be requested to create a username and password for future access to his/her account at the website. Also, the user may want to schedule future broadcasting sessions by accessing its information and updating its information if necessary. At the website, a schedule of all broadcasts are listed and any user may register to listen to such broadcasts. The user may access the website to register through the use of a smart cellular phone, a laptop, a tablet, a desktop computer or any Internet accessible device. Depending on the operation of the broadcasting system of the present disclosure, listening to certain broadcasts may be free of charge while listening to other broadcasts may require that the listener pay a fee before being provided access to the broadcast. The user can pay with the use of credit cards or with an electronic check allowing the broadcasting to deduct the fee from a bank account provided by the user.

A user may also register to schedule a broadcast or to listen in on a scheduled broadcast via telephone by dialing a customer service number of the broadcasting system of the present disclosure and providing requested information orally. At some time prior to a broadcast, the user will be alerted by the broadcasting system. A user may be allowed to postpone a broadcast as long as the user notifies the broadcasting system in a sufficient time period prior to the scheduled broadcast. All of the information associated with the time of broadcast, the time to listen to a broadcast, the time period for postponing a broadcast are stored in a database where such information is mapped to the identity information provided to a user at time of registration. In other words, after providing all of the necessary information during registration, the broadcasting system of the present disclosure will generate a phone number, which the now registered user can use to broadcast or to listen to a broadcast. This telephone number is the identity information, which when received by the broadcasting system of the present disclosure will cause the system to retrieve the information (stored in database 138 by management module 126) inputted during registration and any subsequent inputted information.

It should be noted that the identity information may also be information that will allow the user to determine which telephone number to dial. That is, the identity information is not necessarily a telephone number, but can be other information that the user can use to contact the broadcasting system to inform the system that he/she is ready to broadcast or is ready to listen to a broadcast. Such an identity information can be transmitted to the broadcasting system via the Internet at a particular webpage defined by the broadcasting system or can be transmitted orally by the user dialing a customer number (established by the owners and operator of the broadcasting system) and informing orally his/her desire to broadcast after answering certain unique information that only the user would know and which the user provided to the broadcasting system during registration. In sum, upon providing the identity information by dialing a telephone number or by providing the identity information to the system upon query, the identity information is extracted by I/O interface 120 and transferred to management module 126. The various steps of the method of the present disclosure is now discussed in view of FIG. 2 which shows a flowchart 200 of such a method.

Referring now to FIG. 2, in step 202, the broadcasting system of the present disclosure receives a call or a request (via the Internet, for example) from a subscriber where such a request contains identity information. The identity information is extracted by the I/O interface 120 and transferred to management module 126 via path 140. In step 204, the broadcasting system determines from the extracted identity information (e.g., the phone number dialed by the calling party) whether such information is associated with a broadcaster or a listener. That is, for a telephone call, the broadcasting system determines whether a received call is a dial to broadcast request or a request to listen to a broadcast. The determination of whether the calling party is a broadcaster or a listener is made by first transferring (by the I/O interface) the extracted identity information to management module 126 via path 140 (see FIG. 1). Management module 126 upon receiving the identity information searches—in database 138—for the user information associated with such identity information. The identity information is mapped to the user information. Part of the user information describes whether the registered subscriber assigned to the extracted identity information is a broadcaster or listener. Management module 126 obtains this mapping from database 138 via path 136. This mapping can be organized in any well-known data structure format. For example, the identity information can be used as a pointer to a subscriber's name and other personal information. The personal information can be further used to point to whether the status of the subscriber is a broadcaster or a listener. The status of the subscriber can further point to the type(s) of communication devices the subscriber intends to uses to broadcast or to listen to a broadcast. Each particular piece of information may have a pointer that points to the address or contents of other information associated with the subscriber. Alternatively, the identity information would serve as a pointer to a memory location where all of the information of a registered subscriber is stored in a particular defined format.

In step 206, the method of the present disclosure (in particular management module 126) has determined that the identity information is assigned to a broadcaster and determines whether the 'dial to broadcast' call by the broadcaster has occurred during a pre-broadcast time window (say, for example, 15 minutes or less prior to the scheduled broadcast time). The pre-broadcast time window is a time period occurring immediately prior to the scheduled broadcast time within which the broadcaster should call the broadcasting system to begin with the preliminaries of the broadcast. The operators (or owners or both) of the broadcast system of the present disclosure define the length or duration of the pre-broadcast time window and that information is provided to the subscriber at time of registration. The pre-broadcast time window is adjustable—it can be adjusted by the operators of the broadcasting system or by the registered subscriber. However, the adjustment (either by the operator or by the subscriber) is to be done a certain number of hours prior to time of broadcast. That number of hours is also adjustable by the operators. Also, the time of broadcast can be changed at virtually any time under specific conditions set by either the owners and/or operators of the broadcasting system or by the subscriber with the consent of the owners or operators. Otherwise, it is the owner or operator of the broadcasting system who sets the pre-broadcast time window at time of subscriber registration.

Say, for example, if the pre-broadcast time window is 15 minutes then the broadcaster is to dial to broadcast 15 minutes or less before the scheduled broadcast time to alert the system that there is no postponement and that the broadcast will proceed as scheduled. If there is no call 15 minutes or less prior to the scheduled start of the broadcast, then the system will wait another 5 minutes (referred to as "the postponement time period" discussed infra), and if there is still no call from the broadcaster after that time, the broadcast is automatically postponed. In general, the owner or operator of the broadcasting system will postpone the broadcast when the broadcaster has not called after a certain time has lapsed (i.e., postponement time) from the start of the pre-broadcast time window. In the example given immediately above, the postponement time is 5 minutes. Other approaches can be used to postpone a broadcast—such as a subscriber informing the operators of the broadcasting system of a personal emergency or other personal situation that would prevent the broadcast to proceed. Such an alert by the broadcaster is to be done preferably several hours prior to time of broadcast.

If the broadcaster's call (e.g., a dial to broadcast request) occurs outside of the pre-broadcast time window (say, e.g., 20 minutes prior to the scheduled broadcast with a defined pre-broadcast time window of 15 minutes), the method of the present disclosure will move to step 214 wherein it sends a wait message (e.g., voice message, text, email, certain number of audio beeps signaling to wait or any combination thereof) to the broadcaster instructing the broadcaster to wait for 5 minutes (or to wait for whatever the amount of time that is needed to fall within the window) before the system can allow the broadcaster access to a broadcast channel to start making preparations for broadcasting. At this point, the subscriber has already called or logged in and thus the system will allow the requisite time period to lapse before moving on to start preparing for the imminent broadcast. Once the subscriber has waited the necessary amount of time to be within the pre-broadcast time window, the method of the present disclosure moves to step 208 where preliminary preparation for broadcast are performed by the broadcasting system of the present disclosure. That is, we move to the step of performing broadcast preliminaries when the broadcast system has determined that the call is a dial to broadcast request that has occurred during a defined pre-broadcast time window.

In step 208, preparations or broadcast preliminaries—performed under the direction of the broadcasting system—include the broadcaster to operate his/her user equipment to send test signals (e.g., speaking repetitively a brief phrase, sending a test video stream, or sending graphics) to make sure audio, video or other signals are being properly received by the broadcasting system. The broadcasting system can download a defined test signal stream (e.g., a video stream, audio stream, text stream or any combination thereof) onto the user equipment (e.g., communication device, mobile terminal, laptop, smartphone, IP phone) of a registered subscriber and the broadcasting system can direct the broadcaster user equipment to transmit the test signal (originating from the broadcasting system) back to the broadcasting system for analysis; this analysis will allow the broadcasting system to determine the quality of the network or communication channel through which signals to be broadcast will traverse.

The downloading can be done during the preliminaries (or preliminary period) or during registration. One manner in which the downloaded stream can be transmitted back is to send a message to the user of the communication device to type a special key sequence to cause such transmission to occur. During such preparations, the system—in particular, the signal processing module 124 and broadcast module 122—can make adjustments to the various signal levels and signal quality transmitted by the broadcaster. These adjustments are controlled by management module 126, which adjusts various parameters of circuits and systems within management module 126, broadcast module 122 and I/O interface 120 in iterative fashion until operator/owner defined signal level and signal quality are met.

Management module 126 determines whether the signals received from the broadcaster have been appropriately processed and ready to be transferred to broadcast module 122 and onto I/O interface 120 for broadcasting to subscribed listeners. The broadcast system of the present disclosure may also have test listener device(s) registered as listeners, but which are programmed to transmit the received signal levels and qualities back to the broadcasting system to provide signal level and signal quality data or associated information or both back to the broadcasting system. The test listener devices (not shown) are positioned within the various different communication networks (e.g., 102, 104, 106) to which the broadcasting system of the present disclosure is coupled. Thus, the test listener device(s) report signal quality and signal levels broadcast from the broadcasting system of the present disclosure. These test listener devices are part of the broadcasting system of the present disclosure.

Alternatively, the broadcasting system of the present disclosure can download an "app" onto a listener's mobile device (after or during registration) where said app measures signal quality (e.g., phase, amplitude level, frequency response) during a broadcast and reports—in real time—all information associated with signal quality to the broadcasting system during a broadcast. The signal quality information can be reported in delayed fashion or it can be accumulated and then transmitted to the broadcasting system after the broadcast. In this manner, the broadcasting system of the present disclosure can adjust the broadcast signal on a listener device by listener device basis. Also any other necessary preparations particular to the scheduled broadcast and the broadcaster are also addressed at this time by the broadcasting system of the present disclosure. For example, the broadcasting system (in particular, management module 126) affirms that the broadcaster's account is current. If not, the broadcast may be requested to make payment(s) immediately to bring his/her account current. Also, during these preliminaries the broadcast system sends messages to the user equipment requesting confirmation of the user operating the user equipment. After the broadcast preliminaries are done, the method of the present disclosure moves to the broadcast phase.

In step 210, the method of the present disclosure allows signals from the broadcaster to be received by the I/O interface 120 and—under the control of management module 126—said signals are processed or adjusted or both by signal processing module 124 and broadcast module 122 so as to be in acceptable format for broadcasting. The broadcasting module 122 through I/O interface 120 broadcasts the signals to listeners who have logged in or called in to listen to the broadcast. At some point during the broadcast (at a defined time instance as defined by the system or by the subscriber or both), the broadcasting system of the present invention, will allow a question and answer session to occur between the broadcaster and a listener having a question and answer privilege; typically this would toward the end of the broadcast, but not necessarily. The broadcast system, upon initiating the question and answer session, broadcasts an announcement to all registered listener user equipment inviting questions from eligible registered listener equipment.

In one embodiment, the questions originate from eligible registered user listening equipment at selective time instances controlled by the broadcasting system. This question and answer period will be broadcast to all of the listeners to the broadcast. That is, all of the listeners—having or not having the question and answer feature—will be able to hear the conversation between the broadcaster and a listener asking questions or conversing with the broadcaster. The length of the question and answer period is set by the broadcasting system. However, the broadcaster or listener can terminate the question and answer session at any time prior to its defined period. Also, the broadcaster is given the control to lengthen the question and answer period for any one listener if the broadcaster has paid for such a feature or has obtained such a privilege based on parameters defined by the broadcasting system of the present disclosure.

The broadcasting system of the present disclosure will allow certain listeners with certain privileges (obtained though payment of extra subscription fee or through any other manner determined by the broadcasting system) to initiate the call and answer feature at some defined point in the broadcast. A call and answer session is initiated by a listener, but once started can be terminated at any time by the broadcaster or listener. At some point during the broadcast, all listeners and the broadcaster will be informed (e.g., via text, graphical indication, email, streaming text, audio, video insert) by the broadcasting system when the question and answer period has started and listeners with the call and answer privilege will be invited to ask questions by dialing their call and answer code transmitted to them during registration. The broadcaster may have the feature of eliminating the call and answer session at any time prior to it pre-defined start. This can be achieved by the broadcaster pressing, typing, or dialing a defined code, which is detected by the broadcasting system of the present disclosure and interpreted by the system as a signal to eliminate the call and answer session altogether; the system would inform the listeners that the call and answer session has been eliminated for this broadcast. Also, during the broadcast, the broadcaster can decide to terminate the broadcast prematurely; that is, the broadcaster can terminate the broadcast prior to the lapsing of its set or defined time period. Otherwise, the broadcast ends when its defined time period has lapsed. A broadcaster terminates the broadcast prematurely by typing, pressing, dialing or otherwise transmitting a code (broadcast termination code) received by the broadcaster during registration.

In step 212, the broadcasting system of the present disclosure has detected a broadcast termination signal carrying the broadcast termination code given to the current broadcaster by the system during registration. Also, if the time period defined by the system for the current broadcast has lapsed, the system will send a courtesy video, audio, graphical or text message informing everyone (listeners and broadcaster) that the broadcast is about to end because either (1) the broadcaster has terminated the broadcast or (2) the time period allotted for this broadcast has expired. A broadcaster who has prematurely terminated a broadcast or a broadcast which has prematurely terminated due to technical difficulties or unforeseen circumstances not directly attributable to the broadcaster will result in the broadcaster being credited for the unused broadcast time. The unused or remaining broadcast time can be used or added to new time or additional time bought by the subscriber for future broadcasts.

Referring back to step 204, if the broadcasting system has determined that the call (or login request) is from a listener, the method of the disclosure moves to step 216. The system provides access to the broadcast to a registered listener user equipment when the extracted information for this user maps to information identifying the call as originating from a registered listener user equipment. The broadcasting system then determines whether the listener has requested to listen to a broadcast that has already started (or has the request occurred during a pre-broadcast time window) and to which the listener is eligible to listen. The listener may be required to pay in order to listen to the broadcast if this is a broadcast that requires listeners to pay to hear the broadcast. If the listener is requesting to listen to a scheduled broadcast, during the occurrence of the pre-broadcast time window or during the broadcast, the method of the disclosure will move to step 218. However, if the request of the listener occurs prior to the occurrence of the pre-broadcast window for that broadcast, the method of the broadcasting system of the present disclosure will send a 'wait msg' to the listener advising the listener to either hang up and call back later or wait until the pre-broadcast time window has occurred. The listener is thus given the option to wait, or hang up and call later at a time immediately prior to the start of the broadcast or at a time immediately prior to the start of or within the pre-broadcast time window. After having waited until sufficient time has elapsed and the pre-broadcast time window has started, the method of the present disclosure moves to step 218.

Prior to the start of the broadcast, the listener may be asked to send DTMF (Dual Tone Multi-Frequency) test tones or a combination of DTMF tones by pressing or dialing certain string of numbers representing codes given to the listener during registration. These tones may be used by the broadcasting system of the present disclosure to obtain characteristics of channels through which the listener device will communicate with the broadcasting system. Further, the tones or series of tones may also be used to represent certain codes that the listener can use to initiate a 'question and answer session' during the 'question and answer' session of the broadcast. The transmission of these tones or test signals (e.g., signal stream) are part of broadcast preliminaries where the system directs listener user equipment to transmit test signal streams where the test signal streams originated from the broadcasting system and were downloaded onto the user equipment by broadcasting system during registration or during these preliminaries. Also, during these preliminaries the broadcast system sends messages to the user equipment requesting confirmation of the user operating the user equipment. The ability of the listener to attempt to ask questions during a question and answer period is a feature that the listener decides to obtain (by paying the proper fees) during registration.

In step 220, the listener is allowed to hear the broadcast in whatever format for which the listener registered. That is, the listener can view or listen to the broadcast as a video stream (or, e.g., audio stream, or streaming text, or graphics+audio stream, video stream+streaming text) originating from the broadcaster (i.e., from the communication equipment of the broadcast). During the broadcast, the broadcasting system of the present invention will determine if any of the listeners have 'question and answer' privileges. If so, at the time of the question and answer period, the broadcasting system of the present disclosure will broadcast a message to all listeners inviting them to ask questions or make comments to the broadcaster and the listening audience.

The question and answer period will automatically terminate after a defined period of time has expired. Also, the broadcaster may decide to terminate the question and answer period at any time before the defined period of time has expired. Also during the broadcast, in step 222, the broadcasting system monitors the time elapsed to determine the expiration time of the broadcast (base on the particular time period for which the broadcaster registered) where such broadcast will end automatically upon expiration of the defined time period for the broadcast. The length of the broadcast is determined at time of registration where the broadcaster will agree to pay for a specific length of time of broadcast based on rates provided by the operators or owners of the broadcasting system. Also, the broadcaster may decide to end the broadcast prematurely by transmitting a code (by pressing or dialing a code on a dial pad of his/her communication device) given to the broadcaster—called the EOP (End Of Program)—during registration. The transmission of the EOP code is a request by the broadcaster to have the broadcasting system end the broadcast. Thus, during a broadcast, when the time period of the broadcast has expired or when the broadcasting system receives and EOP request from the broadcaster, the method of the present disclosure moves to strep 224 and ends the broadcast.

Returning back to step 216, if the listener, on a particular day, has requested to listen to a broadcast that will not occur that particular day, the method of the present disclosure moves to step 226. In step 226, the broadcasting system has determined that the broadcast for which the listener has registered will not occur on the day the listener broadcast request (by dialing or making a login request) is made; that is, when the broadcasting system has determined that no broadcast will occur for a request received from a user listening equipment, the system sends a 'no broadcast message.' Thus, in step 226, the broadcasting system sends a 'no broadcast message' to the listener via any one of the following formats: text, email, text stream, voice recording, video clip, video clip+text or text stream. In step 228, the broadcasting system of the present disclosure will send a message informing the listener as to when the broadcast(s) for which the listener has registered will occur. Further, the broadcasting system of the present disclosure will display the various broadcasts to the listener (i.e., on the display of the communication device of the listener—if possible) that are currently occurring and the broadcasts scheduled for that day and invites the listener to register for any of these broadcasts; that is, the system transmits a message to the registered user equipment inviting access to recorded broadcasts. For communication devices that do not have displays, a voice synthesized message informing the listener of the broadcasts and the time of broadcasts will be transmitted to the listener; this message can also be sent in the form of text. In step 230, the listener may or may not agree to register for or to request to listen to another broadcast that is currently occurring or will occur on that day. If the listener does not want to request for or register for another broadcast at this time, the method of the present disclosure will move to step 232 wherein the listener's call is terminated. If, however, the listener agrees to look into registering for another broadcast, the method of the present disclosure will allow the listener to register or at least review the broadcasts currently available for that day and decide whether he/she want to register for a currently available broadcast as described above.

It will be readily understood that the broadcasting system of the present disclosure is able to perform all of the steps with respect to FIG. 2 for more than one listener, or more than one broadcaster or more than one subscriber at the same time. That is, a plurality of broadcasts may be transmitted to a plurality of listener groups at the same time where each listener group comprises one or more listeners.

The particular embodiments disclosed above are illustrative only, as the disclosed subject matter may be modified and practiced in different but equivalent manners apparent to those skilled in the art having the benefit of the teachings herein. It will be apparent to persons skilled in the relevant art (s) that various changes in form and detail can be made herein without departing from the spirit and scope of the various example embodiments discussed herein. No limitations are intended to the details of construction or design herein shown, other than described in the claims below. It is therefore evident that the particular embodiments disclosed above may be altered or modified and all such variations are considered within the scope of the disclosed subject matter. Thus, this description of various embodiments should not be limited by any of the above-described exemplary embodiments, but should be defined only in accordance with the following claims and their equivalents. Accordingly, the protection sought herein is as set forth in the claims below.

While various aspects of the present disclosure have been described above, it should be understood that they have been presented by way of example and not limitation. It will be apparent to persons skilled in the relevant art(s) that various changes in form and detail can be made therein without departing from the spirit and scope of the present invention. Thus, the present disclosure should not be limited by any of the above-described exemplary aspects, but should be defined only in accordance with the following claims and their equivalents.

In addition, it should be understood that the figures in the attachments, which highlight the structure, methodology, functionality and advantages of this disclosure, are presented for example purposes only. This disclosure is sufficiently flexible and configurable, such that it may be implemented in ways other than that shown in the accompanying figures.

What is claimed is:

1. A broadcasting system comprising:
an input/output (I/O) interface;
a signal processing module coupled to the I/O interface;
a broadcast module coupled to the I/O interface; and
a management module coupled to the broadcast module, the I/O interface and signal processing module, where
the I/O interface extracts identity information from a received signal, transfers the extracted identity information to the management module and transfers the received signals to the signal processing module for generating a processed signal, such that
when the management module determines that the extracted identity information matches stored information previously generated by the management module during a broadcaster registration process, the management module transfers the processed signal to the broadcast module for broadcasting; and
when the management module determines that the extracted identity information matches stored information previously generated by the management module during a listener registration process, the management module broadcasts to a user equipment whose information was stored during the listener registration process where the system adjusts the broadcast signal to the user equipment based on signal quality information received from an app downloaded onto the user equipment by the system.

2. The broadcasting system of claim 1 further comprising a database coupled to the management module where said database contains identity information and other information received by the broadcasting system during a registration process where the broadcasting system maps the identity information to stored information received during a registration process for a broadcaster or a listener and where the broadcasting system generates a data structure that maps the identity information generated by the broadcasting system to the information obtained during the registration process.

3. The broadcasting system of claim 1 where the I/O interface comprises signal transmitters and receivers configured to respectively transmit or receive or transmit and receive signals to and from digital wireless communication networks, hybrid analog/digital wireless communication network, packet switched communication networks and voice communication networks and said I/O interface further comprises at least one I/O processor for controlling the receivers and transmitters and for processing signals to be transmitted by the transmitters and signals received by the receivers.

4. The broadcasting system of claim 3 where the at least one I/O processor is at least one of a microprocessor, a microcontroller, a microcomputer, a digital signal processor, a server, a laptop computer, a desktop computer, a server or any combination thereof.

5. The broadcasting system of claim 3 where the at least one I/O processor categorizes a portion of the received signals and transfers said signals along with the generated categorization information to the management module.

6. The broadcasting system of claim 3 where the digital wireless communication networks are one of 2G, 3G, 4G LTE, VoLTE wireless communication networks or Voice over Internet Protocol (VoIP) networks.

7. The broadcasting system of claim 3 where the voice communication network is a Public Switched Telephone Network (PSTN) or a Public Switched Digital Network.

8. The broadcasting system of claim 3 where the voice communication network is a voice over Internet Protocol (VoIP) network.

9. The broadcasting system of claim 3 where the hybrid analog/digital networks are 2G and 3G networks.

10. The broadcasting system of claim 3 where the packet switched communication network is the Internet.

11. The broadcasting system of claim 1 where the received signals are analog signals, digital signals or digital signals formatted as packets in accordance with one or more protocols of one or more communication networks from which said signals are received.

12. The broadcasting system of claim 1 where the transmitted signals are analog signals, digital signals, or digital signals formatted by the 11O interface in accordance with one or more protocols associated with one or more communication networks to which said signals are transmitted.

13. The broadcast system of claim 1 the signal processing module comprises analog circuitry, digital circuitry, filters and at least one of a processor, controller, a digital signal processor, a microprocessor, a microcontroller, a microcomputer, a server, a laptop computer, a desktop computer or any combination thereof and analog and digital circuits to process, adjust and reduce distortions and generally prepare these signals for broadcasting.

14. The broadcast system of claim 13 the management module comprises at least one processor, controller, a digital signal processor, a microprocessor, a microcontroller, a microcomputer, a server, a laptop computer, a desktop computer or any combination thereof.

15. A method comprising: determining, by a broadcasting system, whether a received call signal is a dial to broadcast request or a request to listen to a broadcast; and broadcasting, by the broadcasting system, information received in the call signal to one or more registered listener user equipment after having extracted identity information from the call signal, which identity information maps to stored information identifying the call signal as originating from a registered broadcaster user equipment and which identity information was generated by the broadcasting system during a registration process and where the broadcasting system adjusts the broadcast signal to the user equipment based on signal Quality information received from an app downloaded onto the user equipment by the system.

16. The method of claim 15 where the information that is being broadcast is recorded and stored in a database.

17. The method of claim 15 where the identity information is a telephone number dialed to initiate the call.

18. The method of claim 15 where the identity information is a system generated password or system generated sequence of alphanumeric characters during registration.

19. The method of claim 15 where the broadcasting system confirms that the user equipment from which the call originates is a registered broadcaster user equipment.

20. The method of claim 19 where the confirmation of the broadcasting system is based on receiving answers to questions where such answers match previously documented answers to the same questions during a registration process.

21. The method of claim 15 where a question and answer session is initiated by the broadcasting system at a defined time instance during a broadcast.

22. The method of claim 21 where upon initiating the question and answer session, the broadcasting system broadcasts an announcement to all registered listener user equipment inviting questions from eligible registered listener user equipment.

23. The method of claim 22 where the questions originate from eligible registered listener user equipment at selective time instances controlled by the broadcasting system.

24. The method of claim 23 where the questions from eligible listener user equipment are broadcast to all listeners of the broadcast.

25. The method of claim 15 further comprising the step of providing access to the broadcast to registered listener user equipment when the extracted identity information maps to information identifying the call as originating from a registered listener user equipment.

26. The method of claim 15 where the step of determining whether a received call is a dial to broadcast request or a request to listen to a broadcast further comprises determining whether the received request has occurred during a defined pre-broadcast time window.

27. The method of claim 26 further comprising the step of performing broadcast preliminaries upon determining that the received call is a dial to broadcast request that has occurred during a defined pre-broadcast time window.

28. The method of claim 27 where the broadcast preliminaries comprise the system directing broadcaster user equipment or listener user equipment to transmit test signal streams where the test signal streams originated from the broadcasting system and were downloaded onto the user equipment by broadcasting system during the broadcast preliminaries or during registration.

29. The method of claim 27 where the broadcast preliminaries comprise messages sent to the user equipment requesting confirmation of identity of user operating the user equipment.

30. The method of claim 26 further comprising the step of sending a wait message to user equipment that transmitted a dial to broadcast request that has occurred outside of the pre-broadcast time window.

31. The method of claim 30 where the wait message is a voice message or a text or an email.

32. The method of claim 25 where the broadcasting system transmits a no broadcast message to the registered user listener user equipment.

33. The method of claim 25 where the system transmits a message to the registered listener user equipment inviting access to recorded broadcasts.

* * * * *